M. A. CORBETT & F. E. STEVENS.
SUPPORT OR HANGER FOR GAS METERS.
APPLICATION FILED JUNE 20, 1910.

988,930.

Patented Apr. 4, 1911.

Witnesses

Inventor
Michael A. Corbett
Frank E. Stevens
By
C. C. Shepherd Attorney

UNITED STATES PATENT OFFICE.

MICHAEL A. CORBETT AND FRANK E. STEVENS, OF COLUMBUS, OHIO, ASSIGNORS TO THE CORBETT-STEVENS COMPANY, OF COLUMBUS, OHIO, A CORPORATION OF OHIO.

SUPPORT OR HANGER FOR GAS-METERS.

988,930.

Specification of Letters Patent.

Patented Apr. 4, 1911.

Application filed June 20, 1910. Serial No. 567,834.

*To all whom it may concern:*

Be it known that we, MICHAEL A. CORBETT and FRANK E. STEVENS, citizens of the United States, residing at Columbus, in the county of Franklin and State of Ohio, have invented certain new and useful Improvements in Supports or Hangers for Gas-Meters, of which the following is a specification.

The present invention relates to certain improvements in supports or hangers for gas meters and the like.

In many instances, it has been the practice in installing gas meters, to support the casing through the medium of the branch pipes leading to and from the meter, these pipes being commonly attached or connected at opposite sides of the meter casing. To such a manner of supporting the meter, however, certain disadvantages are incident, the main one being that an undue strain is placed upon the pipes, and the fastening or connection between the meter and the pipe is liable to become injured, thereby permitting the meter to become disengaged.

One of the advantages of our invention, is to provide a simple form of hanger whereby undue strain upon the pipes is avoided and the meter is firmly and conveniently supported.

With this and further objects of a like nature in view, our invention consists in the construction, combination and arrangement of parts set forth in and falling within scope of the appended claims.

Figure 1:
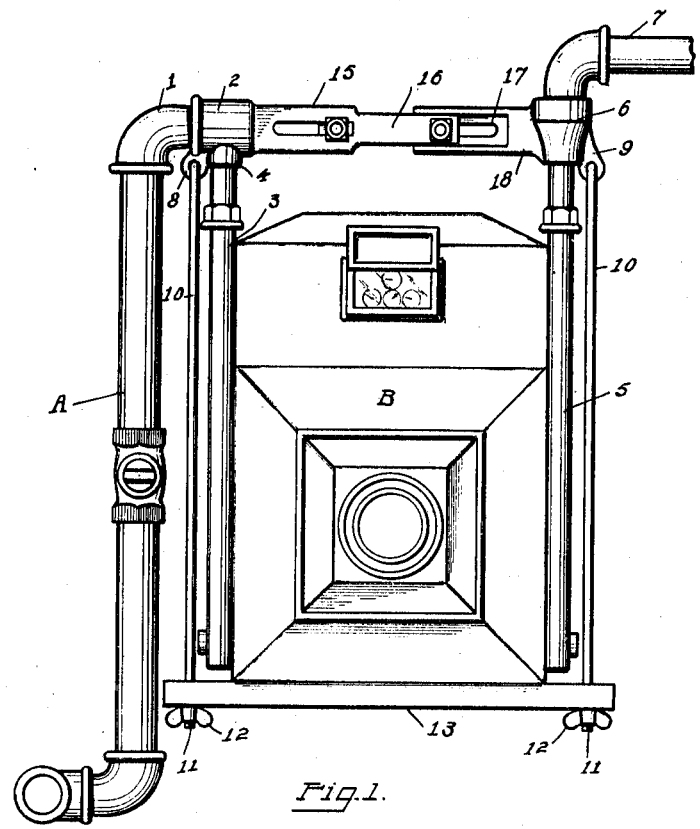
Figure 2:
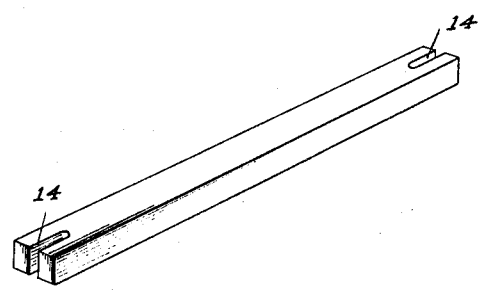

In the accompanying drawings: Figure 1 is a view of our improved support, showing the manner of anchoring the meter thereon. Fig. 2 is a perspective view of one form of supporting bar upon which the meter casing is designed to rest.

Referring now to the accompanying drawings in detail, A indicates an ordinary pipe leading from a source of gas supply and having its elbow 1 threaded into the T-coupling or socket 2, a smaller branch pipe 3 leading from the collar 4 of the socket to the meter casing B. The gas flowing through the meter, passes out through the pipe 5, which is threaded into the coupling 6, a second pipe 7 leading from such coupling to the place of consumption. It will be noted that the inlet and outlet pipes 3 and 5 are connected to the side of the meter, but in order that any undue strain upon said pipes may be relieved, and the meter firmly supported, we have devised a hanger, and the following is a description of one form thereof.

Preferably formed integral with the socket or coupling 2, is a lug 8, a similar lug 9 being formed on the opposite coupling 6. Depending from these lugs are the supporting rods 10, which may be of any suitable form in construction, the terminals of said rods being threaded at 11 to receive the thumb screws 12, whereby the rods may be secured to the cross bar 13, upon which the meter casing rests, said cross bar having the ends thereof slotted as at 14 to receive the terminals of the rods 10. In the present instance, we have shown an adjustable connection above the meter and between the inlet and outlet pipes, said connection comprising a slotted tongue member 15 having the tongue portion 16 thereof lying in the recess 17 formed in the member 18 carried by the socket 6. We wish it to be understood, however, that we do not limit ourselves to the use of this adjustable connection, as it may be dispensed with entirely, but any other suitable form of connection may be employed. Furthermore, we wish it to be understood that we do not limit ourselves to locating the lugs 8 and 9 at the points described, that is to say, forming the same on the couplings 2 and 6, as these lugs may be otherwise placed, or the rods may be suspended from any suitable point.

From the above description, taken in connection with the accompanying drawings, the manner of employing our invention will be readily apparent. The meter casing is permitted to rest upon the cross bar 13 and the thumb screws 12 are then turned to the necessary extent to form a rigid support for the meter casing.

What we claim, is—

1. A hanger or support for gas meters comprising a supporting bar having the ends thereof slotted, a plurality of suspension rods adjustably connected to the slotted ends of the bar, an adjustable member extending above the gas meter, and suspension lugs for the rods carried by said member.

2. A hanger for gas meters comprising a supporting bar upon which the meter casing rests, an adjustable member located above the meter casing, connections between the meter casing and said adjustable member, supporting lugs carried by said member, and suspension rods connected to said lugs and to the bar upon which the casing rests.

In testimony whereof we affix our signatures in presence of two witnesses.

MICHAEL A. CORBETT.
FRANK E. STEVENS.

Witnesses:
A. L. PHELPS,
INGLE A. MORRIS.